(12) United States Patent
Tilak et al.

(10) Patent No.: US 7,313,965 B2
(45) Date of Patent: Jan. 1, 2008

(54) HIGH-TEMPERATURE PRESSURE SENSOR

(75) Inventors: Vinayak Tilak, Schenectady, NY (US); Jie Jiang, Clifton Park, NY (US); David Mulford Shaddock, Troy, NY (US); Stacey Joy Kennerly, Niskayuna, NY (US); David Richard Esler, Mayfield, NY (US); Aaron Jay Knobloch, Rexford, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 11/509,397

(22) Filed: Aug. 25, 2006

(65) Prior Publication Data

US 2006/0283255 A1    Dec. 21, 2006

Related U.S. Application Data

(63) Continuation-in-part of application No. 11/167,719, filed on Jun. 27, 2005, and a continuation-in-part of application No. 11/023,202, filed on Dec. 27, 2004, now Pat. No. 7,181,972.

(51) Int. Cl.
*G01L 9/00* (2006.01)
(52) U.S. Cl. .......................................... 73/705; 73/754
(58) Field of Classification Search ................. 73/705, 73/754
See application file for complete search history.

(56) References Cited

U.S. PATENT DOCUMENTS

| | | | |
|---|---|---|---|
| 4,781,059 A * | 11/1988 | Suzuki et al. .............. 73/117.3 |
| 5,544,526 A | 8/1996 | Baltins | |
| 5,770,887 A | 6/1998 | Tadatomo et al. | |
| 5,892,860 A | 4/1999 | Maron et al. | |
| 6,277,295 B1 * | 8/2001 | Sarkar et al. ................. 216/34 |
| 6,413,627 B1 | 7/2002 | Motoki et al. | |
| 6,488,767 B1 | 12/2002 | Xu et al. | |
| 6,579,068 B2 * | 6/2003 | Bridger et al. ................ 417/53 |
| 6,647,796 B2 | 11/2003 | Beach et al. | |
| 6,923,068 B2 * | 8/2005 | Barron ........................ 73/719 |
| 6,928,878 B1 * | 8/2005 | Eriksen et al. ................ 73/724 |
| 6,953,977 B2 * | 10/2005 | Mlcak et al. ............... 257/414 |
| 2003/0045120 A1 | 3/2003 | Hu et al. | |
| 2005/0059229 A1 | 3/2005 | Minemoto et al. | |

FOREIGN PATENT DOCUMENTS

DE        10221219 A1    4/2003

OTHER PUBLICATIONS

Brian Bircumshaw, "Mircofabrication Primer", pp. 1-12, Apr. 14, 2000.
http://mineral.galleries.com/minerals/halides/cryolite.cryolite.htm, "The Mineral Cryolite", Cryolite (Sodium Aluminum Fluoride, 2 pages.

* cited by examiner

*Primary Examiner*—Andre J. Allen
(74) *Attorney, Agent, or Firm*—Shawn A. McClintic; William E. Powell, II (57) ABSTRACT

A high-temperature pressure sensor that includes a dielectric layer. The pressure sensor also includes a substrate capable of withstanding temperatures greater than 450° C. without entering a phase change, at least one semiconducting material deposited on the sapphire substrate, and a silicon dioxide layer deposited over the semiconducting material. One aspect of the pressure sensor includes a second semiconducting material.

44 Claims, 6 Drawing Sheets

HIGH-TEMPERATURE PRESSURE SENSOR

The present patent application is a continuation-in-part application from U.S. patent application Ser. No. 11/023,202, filed Dec. 27, 2004 now U.S. Pat. No. 7,181,192, and U.S. patent application Ser. No. 11/167,719, filed Jun. 27, 2005, the disclosures of which are hereby incorporated by reference in their entireties.

BACKGROUND

The invention relates generally to pressure sensors, and more particularly to pressure sensors for measuring pressures at high temperatures.

Pressure sensors are used in a wide range of industrial and consumer applications. Pressures of many different magnitudes may be measured using various types of pressure sensors, such as Bourdon-tube type pressure sensors, diaphragm-based pressure sensors, and piezoresistive pressure sensors on silicon or silicon on insulator (SOI). Several variations of the diaphragm-based pressure sensor have been utilized to measure different ranges of pressure, such as by utilizing cantilever-based pressure sensors, optically read pressure sensors and the like.

Figure 1:
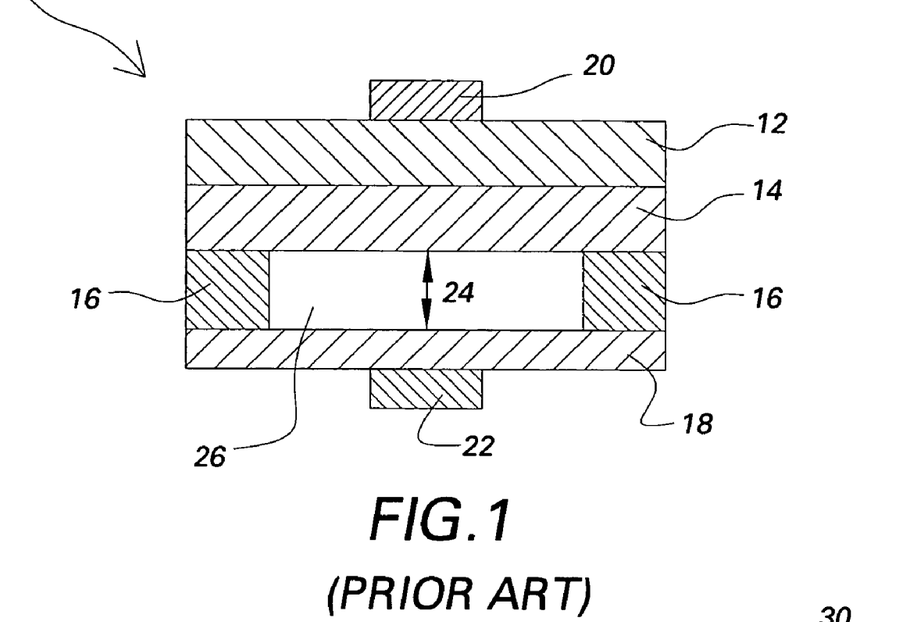
FIG. 1 is a cross-sectional side view of a known pressure sensor.

Some known pressure sensors have been formed using semiconductor materials, and the like, which may be grown on foreign substrates or support layers to form a laminate. A support layer may include, for example, sapphire (aluminum oxide), which may be used because of inherent physical and chemical properties of the aluminum oxide. An example of a suitable semiconductor material is gallium nitride (GaN). Referring specifically to FIG. 1, one known pressure sensor 10 includes silicon material 16 deposited on a substrate 18. A semiconductor material 14 which exhibits piezo-like characteristics when introduced to a force is deposited on the silicon material 16, and is capped with a silicon dioxide layer 12. Optional metallic or ohmic contacts 20, 22 are included. An air gap 26 is defined within the silicon material 16. The change in the thickness 24 of the air gap 26, due to the force upon the semiconductor material 14, is measured and that change is equated with a pressure change.

Figure 2:
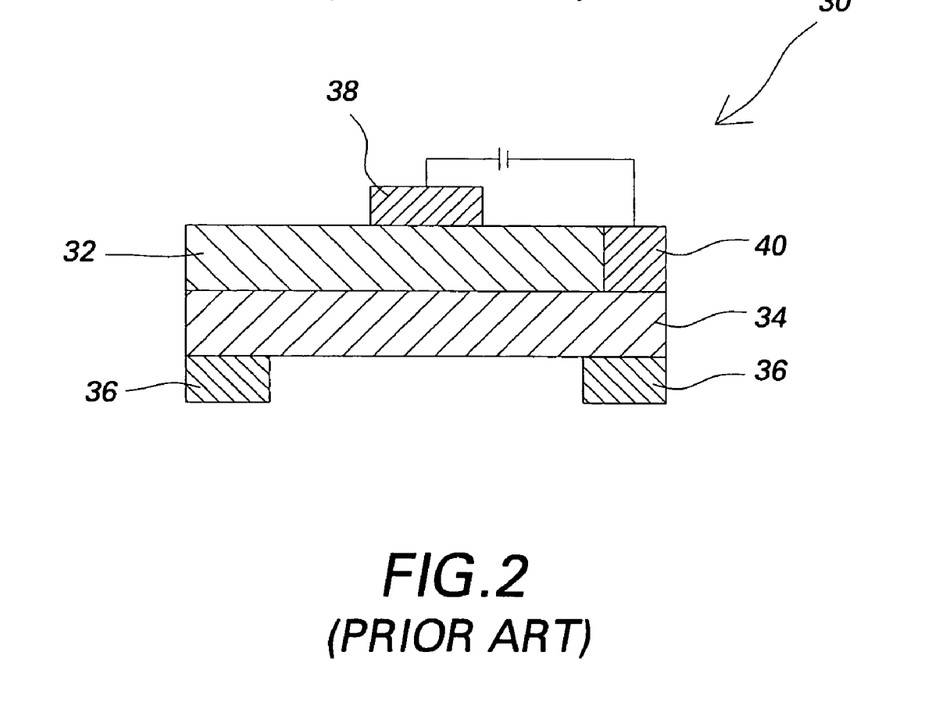
FIG. 2 is a cross-sectional side view of another known pressure sensor.

Another known pressure sensor 30, with specific reference to FIG. 2, includes a semiconductor material 34 having piezo-like characteristics when introduced to a force is deposited on the silicon material 36. The semiconductor material 34 is capped with a silicon dioxide layer 32, and metallic or ohmic contacts 38, 40 are included. A force on the semiconductor material 34 causes the semiconductor material 34 to flex, thereby creating a change in the electrical state of the semiconductor material 34. A circuit between the metallic or ohmic contacts 38, 40 reads the change in resistance due to the flexing of the semiconductor material 34 and converts such change into a pressure change.

BRIEF DESCRIPTION

The invention includes embodiments that relate to a high-temperature pressure sensor that includes a substrate capable of withstanding temperatures greater than 500° C. without entering a phase change, a first semiconducting material deposited on the sapphire substrate, and a dielectric layer deposited over the first semiconducting material. In one aspect of the embodiment, a silicon nitride layer is deposited over the dielectric layer, which may be comprised of silicon dioxide, silicon nitride, or combinations thereof.

The invention includes embodiments that relate to high-temperature pressure sensor that includes a substrate capable of withstanding temperatures greater than 500° C. without entering a phase change, a first semiconducting material deposited on the sapphire substrate, the first semiconducting material including group III nitrides, a second semiconducting material deposited on the first semiconducting material, and a dielectric layer deposited over the second semiconducting material.

The invention includes embodiments that relate to a method for fabricating a high-temperature pressure sensor. The method includes depositing a first semiconducting material on a substrate capable of withstanding temperatures greater than 500° C. without entering a phase change, and depositing a dielectric layer over the first semiconducting material.

Embodiments of the invention relate to a method of fabrication where the substrate is selectively etched to form a diaphragm of semiconductor material. A pressure sensor may be formed by depositing a dielectric layer on top of the first semiconducting material.

Embodiments of the invention relate to a method of fabrication where the substrate is selectively etched to form a diaphragm of semiconductor material. A second semiconducting layer is deposited on the diaphragm of semiconductor material. A pressure sensor may be formed by depositing a dielectric layer on top of the second semiconducting layer.

Embodiments of the invention relate to a method of fabrication where the first semiconductor material and the substrate is etched in a cantilever structure. A first diaphragm layer is attached to the cantilever such that the deflection of the first diaphragm layer bends the cantilever structure These and other advantages and features will be more readily understood from the following detailed description of preferred embodiments of the invention that is provided in connection with the accompanying drawings.

DETAILED DESCRIPTION

The invention includes embodiments that relate to a device incorporating a laminate. The laminate may be an etched or freestanding laminate composed of a single crystal or a quasi-single crystal.

Approximating language, as used herein throughout the specification and claims, may be applied to modify any quantitative representation that could permissibly vary without resulting in a change in the basic function to which it is related. Accordingly, a value modified by a term or terms, such as "about", may be not to be limited to the precise value specified, and may include values that differ from the specified value. In at least some instances, the approximating language may correspond to the precision of an instrument for measuring the value.

Suitable pressure sensors may include a laminate structure and a substrate removable by an etchant that will not adversely affect the laminate structure. The substrate may include aluminum oxide. In one embodiment, an aluminum oxide may include one or more of sapphire, emerald, or ruby, and may be single crystal. Other suitable materials for use in the substrate may include silicon, silicon carbide, silicon nitride or combinations thereof. A suitable substrate may be formed by the Czochralski method.

A suitable etchant according to embodiments of the invention may include a halogenated salt. Suitable halogenated salts may include fluorine-containing salts, such as Cryolite ($Na_3AlF_6$), potassium tetrafluoro borate ($KBF_4$), or both Cryolite ($Na_3AlF_6$) and potassium tetrafluoro borate ($KBF_4$). In one embodiment, an etchant may include a halogenated salt of one or more of a Group I metal (alkali earth), a Group III metal or metalloid, or both.

The laminate structure may be a multi-layer laminate including at least one other layer. This second layer may include one or more of a semiconductor material, or a film formed from an oxide, ceramic, polymer, organic compound, inorganic crystal, polycrystalline material, metal, semi-metal, radioactive material, solid, fluid, gel, suspension, and the like. Suitable semiconductor materials may include one or more of gallium nitride, aluminum nitride, silicon carbide, silicon, silicon-germanium, gallium arsenide, indium nitride, or boron nitride. In one embodiment, a semiconductor may be a crystalline structure that includes one or more of gallium, indium, germanium, arsenic, silicon, nitrogen, carbon, boron, and the like. For example, the semiconductor may include gallium nitride, gallium indium aluminum nitride, gallium indium germanium arsenide, and the like. A semiconductor layer may be formed from a single crystal, quasi-single crystal, or a polycrystalline material.

A single crystal includes material where the atoms form a periodic array. A quasi-single crystal may have a predetermined range of crystal defects, for example, from about 1000 defects to about $10^{12}$ defects per $cm^2$. Polycrystalline material includes a plurality of randomly oriented grains where each grain may include a single crystal.

As used herein, crystal defects may include one or more microcracks or voids, point defects, linear defects, planar defects, or matrix (3-D) defects unless context or language indicates that the subject is a particular subset of defect. Defects also may include cleavage points, grain boundaries, and the like.

Point defects may include one or more of vacancies, interstitials, or impurities. Some point defects may be built-in with the original crystal growth or may be formed in response to thermal energy, radiation, or electrical current.

Line defects may be a defect line created by translation of one part of a crystal with respect to another part of the crystal. A linear dislocation may include one or both of edge dislocation and screw dislocation.

In polycrystalline materials, grains of different orientations may exist. When two grains of different orientation meet, the region in-between the grains, or interface, may be called a grain boundary. Grain boundaries may be interface defects. Depending on the Disorientation between the adjoining grains, different type of grain boundaries may be formed. A tilt boundary may have an axis of rotation parallel to the plane of the grain. A twist boundary may have an axis of rotation perpendicular to the plane of the grain boundary. At the grain boundary the lattice may be disrupted and a strain field may result. Phase boundary dislocations may include stacking faults. Stacking faults may occur when there is a change in the order of crystal planes. An example of this may be in a face centered cubic crystal with the normal plane sequence of ABCABC. A stacking fault may create a plane sequence of ABCABABC.

Epitaxial growth of a semiconductor layer on a substrate may be accomplished by, for example, VPE (Vapor Phase Epitaxy), HVPE (Halide Vapor Phase Epitaxy), MOVPE (Metallorganic Vapor Phase Epitaxy), MBE (Molecular Beam Epitaxy), GS-MBE (Gas Source MBE); CBE (Chemical Beam Epitaxy), MOC (Metallorganic Chloride), MOCVD (Metallorganic Chemical Vapor Deposition), or by sublimation. The MOC method may form a semiconductor film on a substrate by reacting a metallorganic compound (e.g., trimethyl gallium) with halogen-based gas (e.g., HCl) in a hot-wall type furnace. The product may include a metal halide (e.g., gallium chloride (GaCl)). The metal halide may be reacted with a pnictogen or chalcogen gas (e.g., ammonia ($NH_3$)), the product of which may be contacted to the substrate. MOCVD may provide a metallorganic compound (e.g., trimethyl gallium) with hydrogen gas and a pnictogen or chalcogen gas (e.g., ammonia ($NH_3$)) to a heated substrate in a cold-wall type furnace. This may induce the reaction of the metallorganic compound with the pnictogen or chalcogen gas to form a crystal layer on the substrate. HVPE may employ a pure metal (e.g., Ga) to eliminate carbon during crystal growth. This method may prepare the metal in a vessel in a hot wall type furnace. Halogen gas is passed over molten metal in the vessel to form a metal halide volatile species. A carrier gas may convey the volatilized species to a heated substrate where the volatilized species may be impinged with the pnictogen or chalcogen gas. The resulting crystal layer (e.g., GaN) may form on the heated substrate as a crystal film.

The laminate may be a single crystal or a quasi-single crystal grown directly onto the substrate without an intervening layer, which instance removal of the substrate may expose a surface of the single crystal or the quasi-single crystal. Particularly, removing the oxide layer may resulting in a newly exposed surface of a second layer having a micro-structured surface profile on the subsequently exposed surface of the second layer. The resulting surface roughness may be expressed as a root mean square (RMS) surface roughness of less than about 0.1 micrometer in a 10 square micrometer area, in a range of from about 0.1 micrometer in a 10 square micrometer area to about 1 micrometer in a 10 square micrometer area, or greater than about 1 micrometer in a 10 square micrometer area. The surface texture of the etched regions may vary from rough to smooth depending on etching conditions.

In one embodiment, a laminate formed by the method may be a quasi-single crystal, and may have a dislocation density of less than about $10^5$ per $cm^2$, in a range of from about $10^5$ per $cm^2$ to about $10^3$ per $cm^2$, or less than about $10^3$ per $cm^2$. In one embodiment, a laminate formed by the method may have an oxygen impurity concentration of less than $3 \times 10^{18}$ $cm^{-3}$, in a range of from about $3 \times 10^{18}$ $cm^{-3}$ to about $3 \times 10^{17}$ $cm^{-3}$, or less than about $3 \times 10^{17}$ $cm^{-3}$. A suitable method for forming a single crystal or a quasi-single crystal semiconductor layer is disclosed in co-pending U.S. patent application Ser. No. 10/329,982, which is hereby incorporated by reference to the extent that it discloses such methods, and associated electronic devices.

Figure 3:
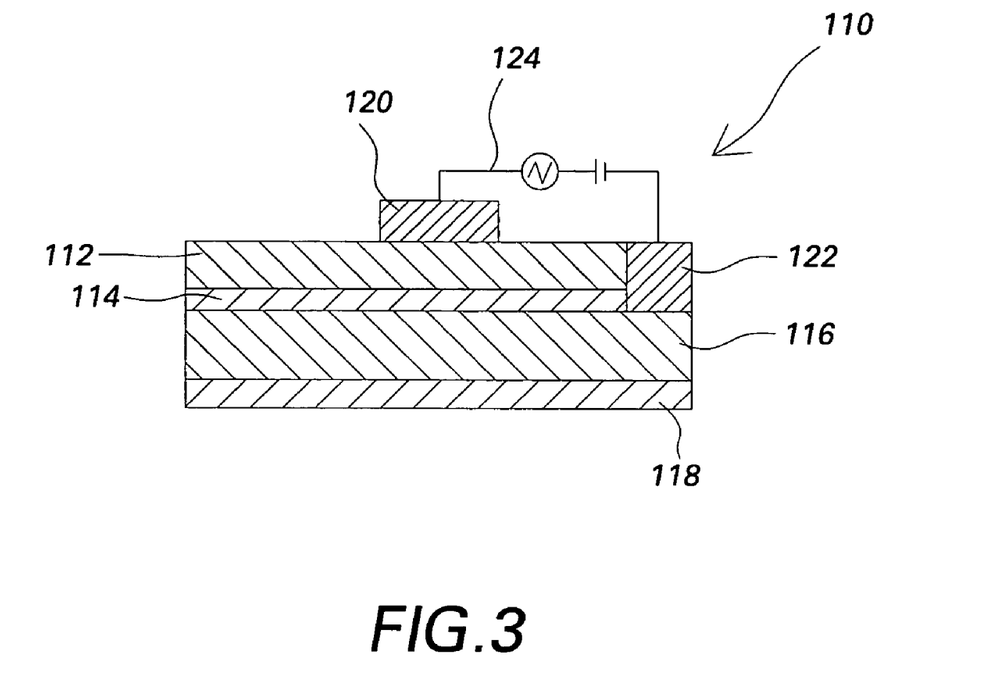
FIG. 3 is a cross-sectional side view of a pressure sensor constructed in accordance with an embodiment of the invention.

With specific FIG. 3 a high-temperature pressure sensor 110 is shown. The pressure sensor 110 may include a mount substrate 118 formed from, for example, silicon, group III nitrides, silicon carbide, aluminum nitride, quartz, sapphire, or sapphire ceramic. A semiconductor layer 116, formed of a group III nitride, such as gallium nitride, or silicon carbide, may be formed by epitaxial growth on the substrate 118 prior to assembly of the pressure sensor 110. A suitable thickness may be, for example, about 30 micrometers thick. A layer of an insulator, such as a dielectric material 114, is deposited on the semiconductor layer 116. The dielectric material 114 may be, for example, silicon dioxide, silicon nitride, or combinations thereof. A silicon nitride cap layer 112 is deposited on the dielectric material 114. A portion of the silicon nitride cap layer 112 and the dielectric material 114 is removed to allow placement of a metallic or ohmic contact 122. A metallic or ohmic contact 120 may be secured to a surface of the silicon nitride cap layer 112. A circuit 124 connects the metallic or ohmic contacts 120, 122. The pressure sensor 110 may sense pressure changes and signal via piezoelectric and/or capacitive means in response to those pressure changes. The pressure sensor 110 may measure one or both of radial and tangential stress.

Figure 5A:
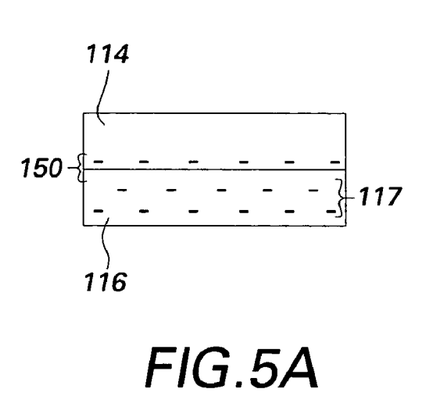
FIGS. 5(A) and 5(B) are schematic representations of electron migration in the pressure sensor of FIG. 3 under, respectively, no load and load.
Figure 5B:
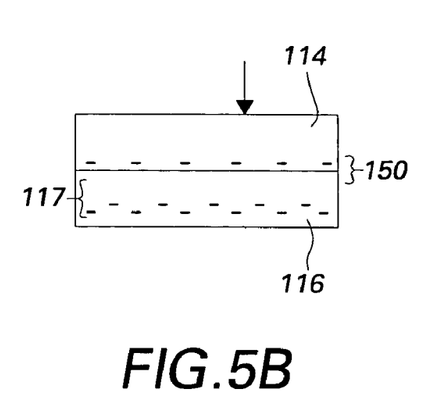

Referring now to FIGS. 5(A) and (B), the movement of electrons within the semiconductor layer 116 is described. Specifically, when there is no load or force subjected on the pressure sensor 110 (FIG. 5(A)) there is a certain amount of negative charges 150 located at the interface between the dielectric material 114 and the semiconductor layer 116. Further, mobile electrons 117 remain scattered throughout the semiconductor layer 116. Referring now to FIG. 5(B), when a load or force is subjected on the pressure sensor 110, the amount of negative charges 150 at the interface increases. This increase in the amount of negative charges 150 leads the mobile electrons 117 within the semiconductor layer 116 to migrate away from the interface. The migration of the mobile electrons 117 away from the interface can be measured by measuring the change in capacitance such a migration causes. The change in the capacitance can be equated with the amount of force exerted on the pressure sensor 110.

Figure 8:
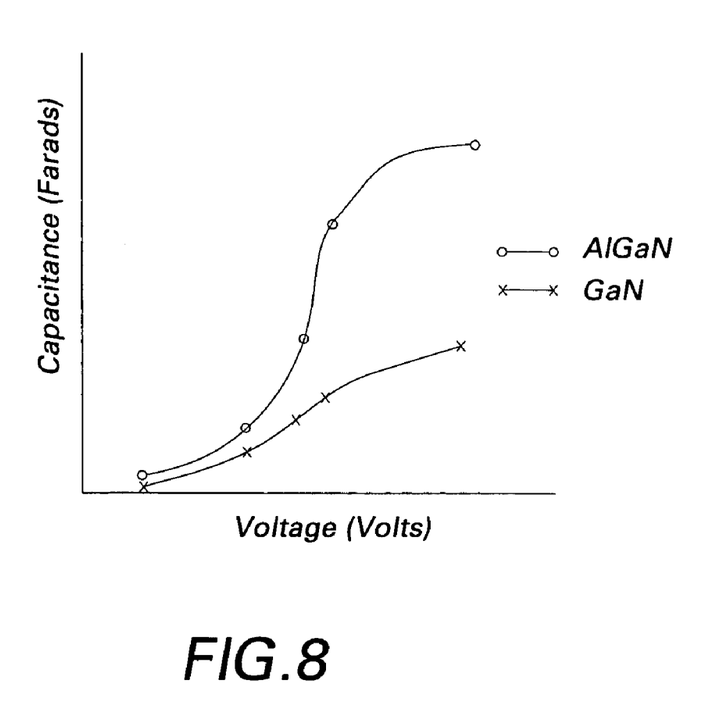
FIG. 8 is a graph representing relative changes in capacitance of aluminum gallium nitride and gallium nitride with changing voltage.

The change in capacitance experienced by a semiconductor layer 116 formed of gallium nitride with a change in voltage (i.e., a change in a force) is relatively low as compared to the change in capacitance experienced by a semiconductor layer formed of alloys of group III nitrides, such as, for example, aluminum gallium nitride (FIG. 8).

Figure 4:
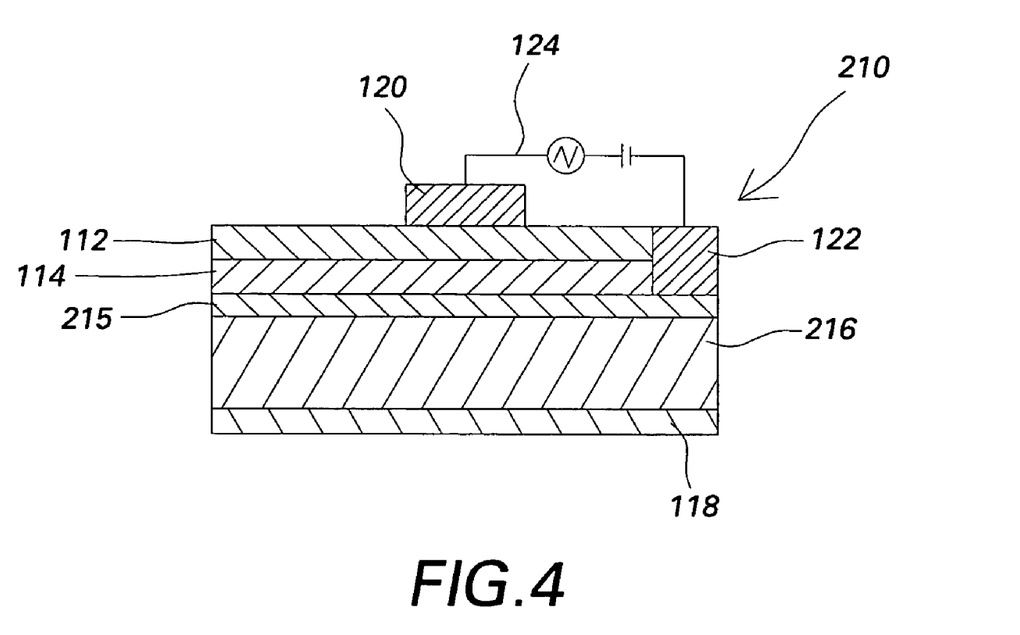
FIG. 4 is a cross-sectional side view of a pressure sensor constructed in accordance with an embodiment of the invention.

Referring now to FIG. 4, there is shown a high-temperature pressure sensor 210 that includes a mount substrate 118 formed from, for example, silicon, aluminum nitride, quartz, or sapphire ceramic. A first semiconductor layer 216, such as gallium nitride, may be formed by epitaxial growth on the substrate 118 prior to assembly of the pressure sensor 110. A suitable thickness may be, for example, about 30 micrometers thick. A second semiconductor layer 215, formed of aluminum gallium nitride, is deposited on the first semiconductor layer 216. A layer of dielectric material 114, such as silicon nitride, silicon oxide, or combinations thereof, is deposited on the semiconductor layer 116. A silicon nitride cap layer 112 is deposited on the dielectric material 114. A portion of the silicon nitride cap layer 112 and the dielectric material 114 is removed to allow placement of a metallic or ohmic contact 122. A metallic or ohmic contact 120 may be secured to a surface of the silicon nitride cap layer 112. A circuit 124 connects the metallic or ohmic contacts 120, 122. The pressure sensor 210 may sense pressure changes and signal via piezoelectric and/or capacitive means in response to those pressure changes. The pressure sensor 210 may measure one or both of radial and tangential stress.

Figure 6A:
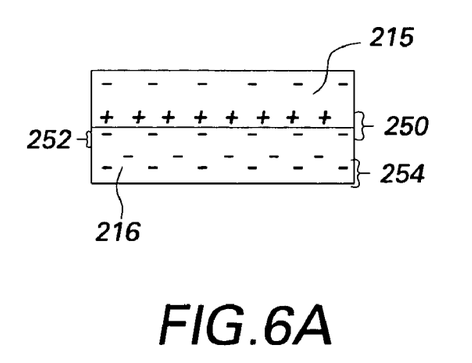
FIGS. 6(A) and 6(B) are schematic representations of electron migration in the pressure sensor of FIG. 4 under, respectively, no load and load.
Figure 6B:
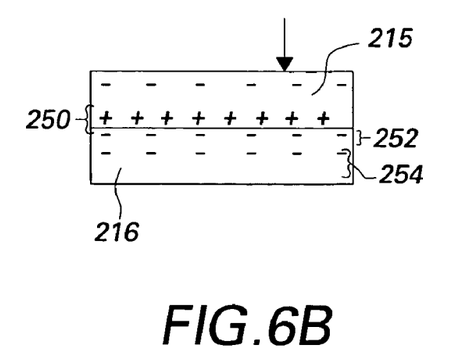

Referring now to FIGS. 6(A) and (B), the movements of electrons within the first and second semiconductor layers 216, 215 are described. Specifically, when there is no load or force subjected on the pressure sensor 210 (FIG. 6(A)) there is a certain amount of positive charges 250 located at the portion of the second semiconductor layer 215 closer to the interface between the second semiconductor layer 215 and the first semiconductor layer 216. Further, there is a certain amount to negative charges 252 at the portion of the first semiconductor layer 216 closer to the interface between the second semiconductor layer 215 and the first semiconductor layer 216. Finally, mobile electrons 254 are scattered throughout the first semiconductor layer 216. Referring now to FIG. 6(B), when a load or force is subjected on the pressure sensor 210, the amount of positive charges 250 at the portion of the first semiconductor layer 216 closer to the interface between the second semiconductor layer 215 and the first semiconductor layer 216 increases. This increase in the amount of positive charges 250 leads the mobile electrons 254 within the first semiconductor layer 216 to migrate toward the interface. The migration of the mobile electrons 254 toward the interface can be measured by measuring the change in capacitance such a migration causes. The change in the capacitance can be equated with the amount of force exerted on the pressure sensor 210.

Figure 7:
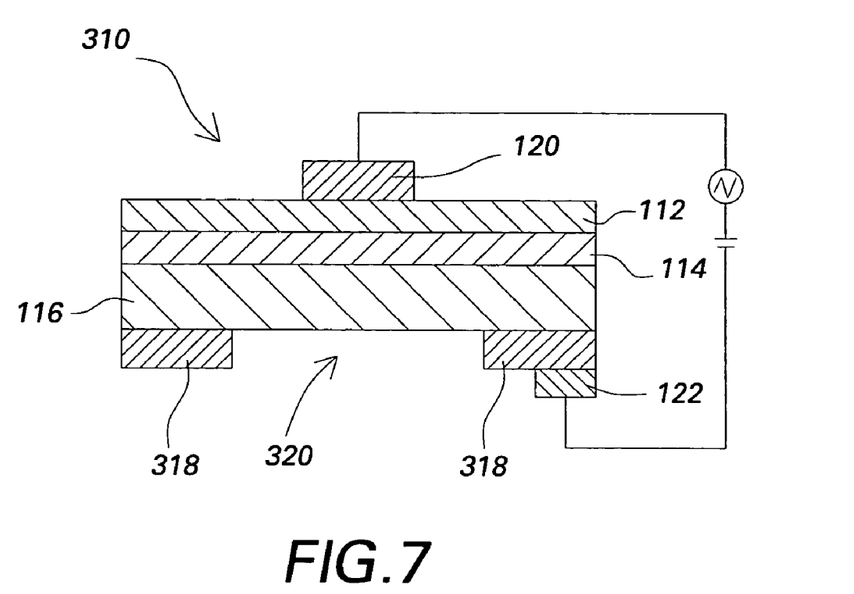
FIG. 7 is a cross-sectional side view of a pressure sensor constructed in accordance with an embodiment of the invention.

Referring now to FIG. 7, there is shown a high-temperature pressure sensor 310 that differs from the high-temperature pressure sensor 110 (FIG. 3) in that the mount substrate 318 has a portion removed so as to define an air gap 320. Specifically, the substrate 318 may be selectively etched to define a diaphragm in the first semiconducting material 116. For substrates 318 formed of, for example, aluminum nitride, quartz, or sapphire ceramic, a suitable etchant may include a halogenated salt. Suitable halogenated salts may include fluorine-containing salts, such as Cryolite ($Na_3AlF_6$), potassium tetrafluoro borate ($KBF_4$), or both Cryolite ($Na_3AlF_6$) and potassium tetrafluoro borate ($KBF_4$). For substrates composed of silicon, potassium hydroxide (KOH), Deep Reactive Ion Etching (DRIE), or ICP etching may be used to define the air gap 320.

Figure 9:
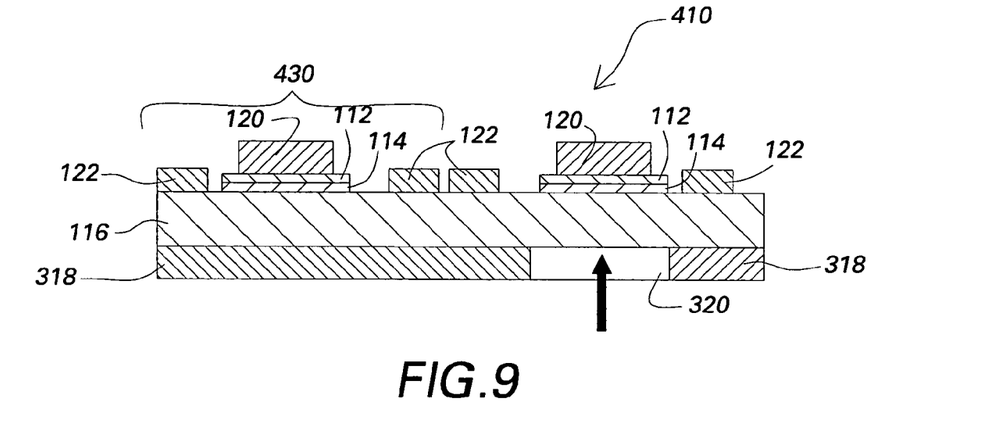
FIG. 9 is a cross-sectional side view of a pressure sensor constructed in accordance with an embodiment of the invention.

Referring to FIG. 9, there is shown a high-temperature pressure sensor 410. The sensor 410 is similar to the sensor 310 (FIG. 7) and includes a temperature compensation capacitor 430. The capacitor 430 includes a dielectric material 114, upon which is disposed a silicon nitride cap layer 112. A metal contact 120 is disposed on the cap layer 112. Exposing the sensor 410 to pressure will cause it to flex, thus altering the capacitance of the sensor 410. The temperature compensation capacitor 430 is, as the name implies, for temperature compensation. It should be appreciated that the piezoelectric material 116 may instead be first and second piezoelectric materials, such as AlGaN and GaN.

Figure 10:
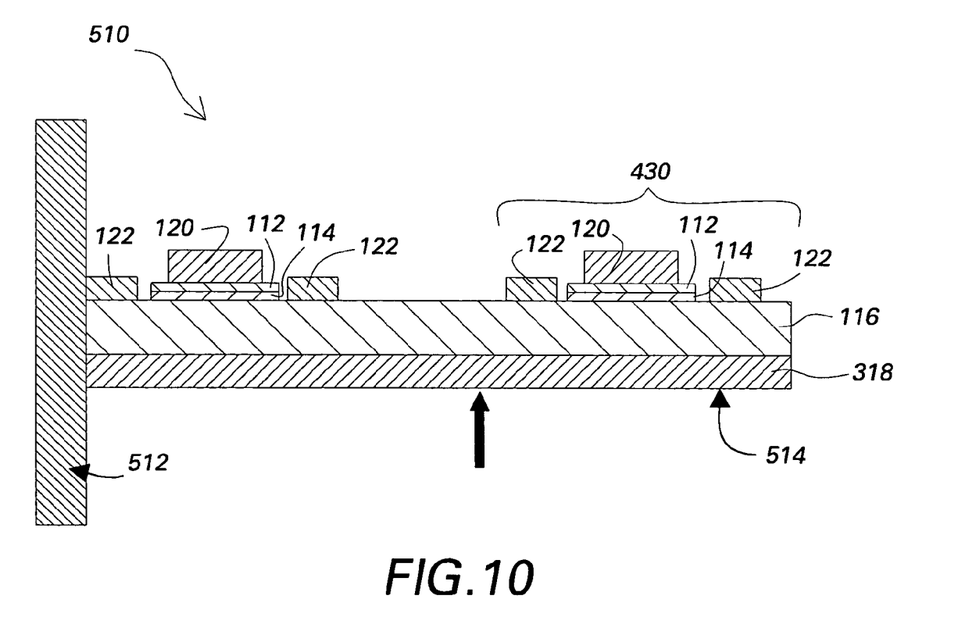
FIG. 10 is a cross-sectional side view of a pressure sensor constructed in accordance with an embodiment of the invention.

Referring to FIG. 10, there is shown a high-temperature pressure sensor 510. The sensor 510 is similar to the sensor 210 (FIG. 3) except that the sensor 510 is affixed at a fixed end 512 and includes a temperature compensation capacitor 430 at a free end 514. The capacitor 430 includes a dielectric material 114, upon which is disposed a silicon nitride cap layer 112. A metal contact 120 is disposed on the cap layer 112. Exposing the sensor 510 to pressure will cause bending of the cantilever, thus altering the capacitance of the sensor 510. The temperature compensation capacitor 430 is, as the name implies, for temperature compensation. It should be appreciated that the piezoelectric material 116 may instead be first and second piezoelectric materials, such as AlGaN and GaN.

Figure 11:
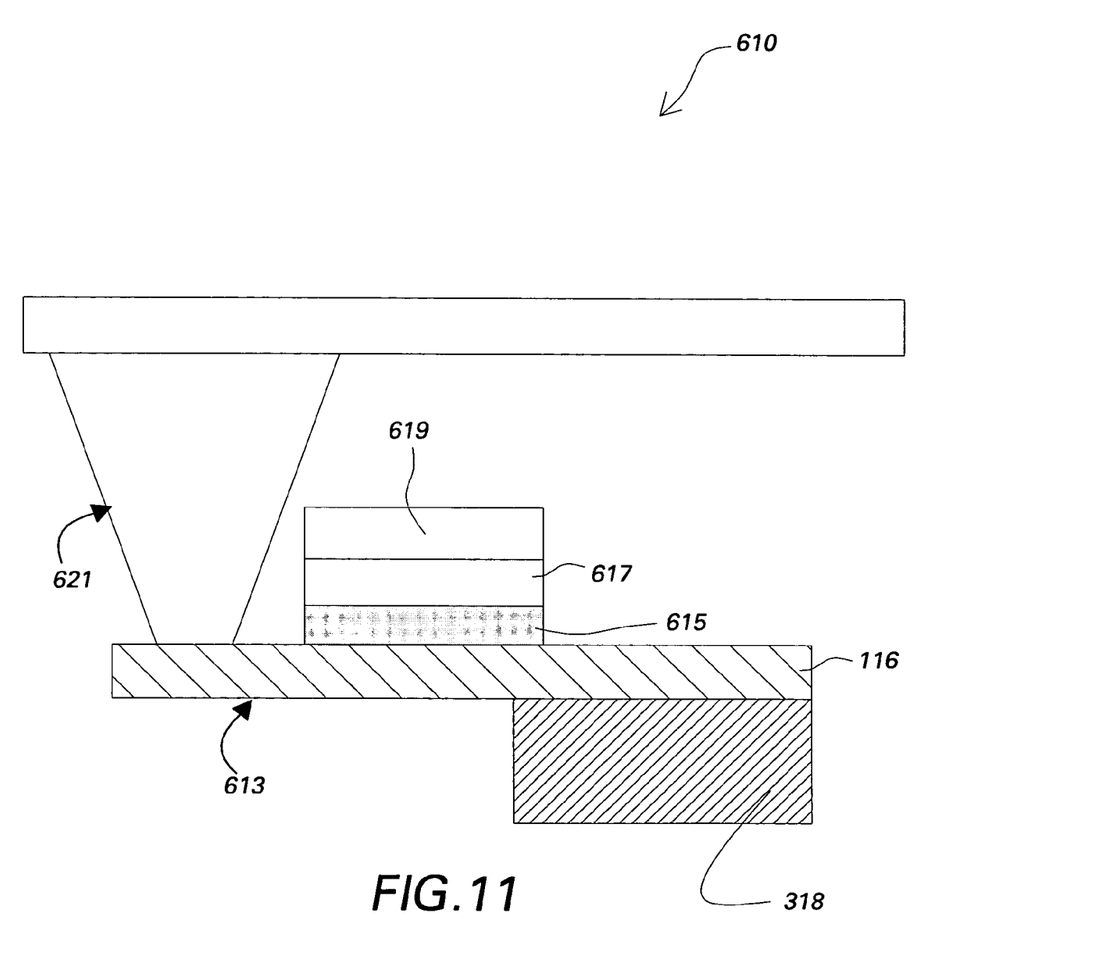
FIG. 11 is a cross-sectional side view of a pressure sensor constructed in accordance with an embodiment of the invention.

Referring to FIG. 11, there is shown a high-temperature pressure sensor 610 that includes a cantilever 613 and a diaphragm 621. The cantilever 613 includes a piezoelectric material, such as material 116, disposed on a substrate, such as the etched substrate 318. It should be appreciated that the piezoelectric material 116 may be a single material, such as gallium nitride, or a combination of several materials, such as aluminum gallium nitride and gallium nitride. Positioned on the cantilever 613 is an insulator material 615, a silicon nitride cap layer 617, a metal contact 619. The diaphragm 621 serves to transmit a force or pressure onto the cantilever 613, thereby altering the capacitance of the piezoelectric material 116.

Now will be described a method of forming a high-temperature pressure sensor, such as the pressure sensors 110, 210, 310. One method for fabricating a high-temperature pressure sensor includes depositing a first semiconducting material on a substrate. The first semiconducting material should be capable of withstanding temperatures greater than 450° C. without entering a phase change. Then, an insulator layer, such as silicon nitride, silicon oxide, or combinations thereof, is deposited over the first semiconducting material. Finally, a silicon nitride layer is deposited on the silicon dioxide layer.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed as new and desired to be protected by Letters Patent of the United States is:

1. A high-temperature pressure sensor, comprising:
   a substrate capable of withstanding temperatures greater than 500° C. without entering a phase change;
   a first semiconducting material deposited on said sapphire substrate; and
   a dielectric material deposited over said first semiconducting material.

2. The high-temperature pressure sensor of claim 1, comprising a silicon nitride layer deposited over said dielectric material.

3. The high-temperature pressure sensor of claim 1, comprising a metallic or ohmic first contact on said dielectric material.

4. The high-temperature pressure sensor of claim 3, comprising a metallic or ohmic second contact positioned adjacent to at least said dielectric material.

5. The high-temperature pressure sensor of claim 1, wherein said dielectric material comprises at least one from the group consisting of silicon dioxide, silicon nitride, and any combinations thereof.

6. The high-temperature pressure sensor of claim 1, wherein said substrate comprises sapphire, silicon, group III nitrides, silicon carbide, aluminum nitride, quartz, or sapphire ceramic.

7. The high-temperature pressure sensor of claim 1, wherein said first semiconducting material exhibits piezoelectric characteristics.

8. The high-temperature pressure sensor of claim 1, wherein said first semiconducting material comprises at least one from the group consisting of group III nitrides and silicon carbide.

9. The high-temperature pressure sensor of claim 8, wherein said first semiconducting material comprises gallium nitride.

10. The high-temperature pressure sensor of claim 1, comprising a second semiconducting material deposited on said first semiconducting material.

11. The high-temperature pressure sensor of claim 10, wherein said second semiconducting material exhibits piezoelectric characteristics.

12. The high-temperature pressure sensor of claim 10, wherein said second semiconducting material comprises an alloy of group III nitrides.

13. The high-temperature pressure sensor of claim 12, wherein said second semiconducting material comprises aluminum gallium nitride.

14. The high-temperature pressure sensor of claim 4, comprising a circuit between said first and second contacts for measuring a response of the pressure sensor to a force.

15. The high-temperature pressure sensor of claim 14, wherein the response comprises a piezoelectric response.

16. The high-temperature pressure sensor of claim 15, wherein the piezoelectric response comprises a change in capacitance.

17. The high-temperature pressure sensor of claim 16, comprising a second capacitor that serves as a reference capacitor.

18. The high-temperature pressure sensor of claim 3, comprising a metallic or ohmic second contact positioned on said substrate.

19. The high-temperature pressure sensor of claim 1, wherein said substrate is selectively etched to define a diaphragm.

20. The high-temperature pressure sensor of claim 1, wherein said substrate and said first semiconducting material are etched to define a cantilever.

21. The high-temperature pressure sensor of claim 20, wherein a diaphragm is attached to the cantilever to transmit pressure.

22. A high-temperature pressure sensor, comprising:
   a substrate capable of withstanding temperatures greater than 500° C. without entering a phase change;
   a first semiconducting material deposited on said sapphire substrate, said first semiconducting material comprising gallium nitride;
   a second semiconducting material deposited on said first semiconducting material; and an insulator material deposited over said second semiconducting material.

23. The high-temperature pressure sensor of claim 22, comprising a silicon nitride layer deposited over said insulator material.

24. The high-temperature pressure sensor of claim 22, wherein said second semiconducting material exhibits piezoelectric characteristics.

25. The high-temperature pressure sensor of claim 22, wherein said first semiconducting material comprises an alloy of a group III nitride.

26. The high-temperature pressure sensor of claim 25, wherein said first semiconducting material comprises aluminum gallium nitride.

27. The high-temperature pressure sensor of claim 23, comprising a metallic or ohmic first contact on said silicon nitride layer.

28. The high-temperature pressure sensor of claim 27, comprising a metallic or ohmic second contact positioned adjacent to at least said silicon nitride layer.

29. The high-temperature pressure sensor of claim 28, comprising a circuit between said first and second contacts for measuring a response of the pressure sensor to a force.

30. The high-temperature pressure sensor of claim 29, wherein the response comprises a piezoelectric response.

31. The high-temperature pressure sensor of claim 30, wherein the piezoelectric response comprises a change in capacitance.

32. The high-temperature pressure sensor of claim 31, comprising a temperature compensation capacitor that serves as a reference capacitor.

33. The high-temperature pressure sensor of claim 27, comprising a metallic or ohmic second contact positioned on said substrate.

34. The high-temperature pressure sensor of claim 22, wherein said substrate is selectively etched to define a diaphragm.

35. The high-temperature pressure sensor of claim 22, wherein said substrate and said first semiconducting material are etched to define a cantilever.

36. The high-temperature pressure sensor of claim 35, wherein a diaphragm is attached to the cantilever to transmit pressure.

37. A method for fabricating a high-temperature pressure sensor, comprising:
   depositing a first semiconducting material on a substrate capable of withstanding temperatures greater than 500° C. without entering a phase change; and
   depositing a dielectric layer over said first semiconducting material.

38. The method of claim 37, comprising depositing a silicon nitride layer on said silicon dioxide layer.

39. The method of claim 37, comprising depositing a second semiconducting material between said first semiconducting material and said dielectric layer.

40. The method of claim 38, comprising:
   depositing a metallic or ohmic first contact on said silicon nitride layer; and
   depositing a metallic or ohmic second contact positioned adjacent to at least said silicon nitride layer.

41. The method of claim 37, wherein said substrate comprises sapphire, silicon, group III nitrides, or silicon carbide.

42. The method of claim 41, comprising forming a diaphragm in said first semiconducting material by selectively etching an air gap in said substrate.

43. The high-temperature pressure sensor of claim 37, wherein said substrate and first semiconducting material is etched to define a cantilever.

44. The high-temperature pressure sensor of claim 43, wherein a diaphragm is attached to the cantilever to transmit pressure.

* * * * *